Feb. 11, 1936.  R. F. ANDERSON  2,030,089
WINDOW FOR VEHICLES
Filed Dec. 18, 1933  2 Sheets-Sheet 2
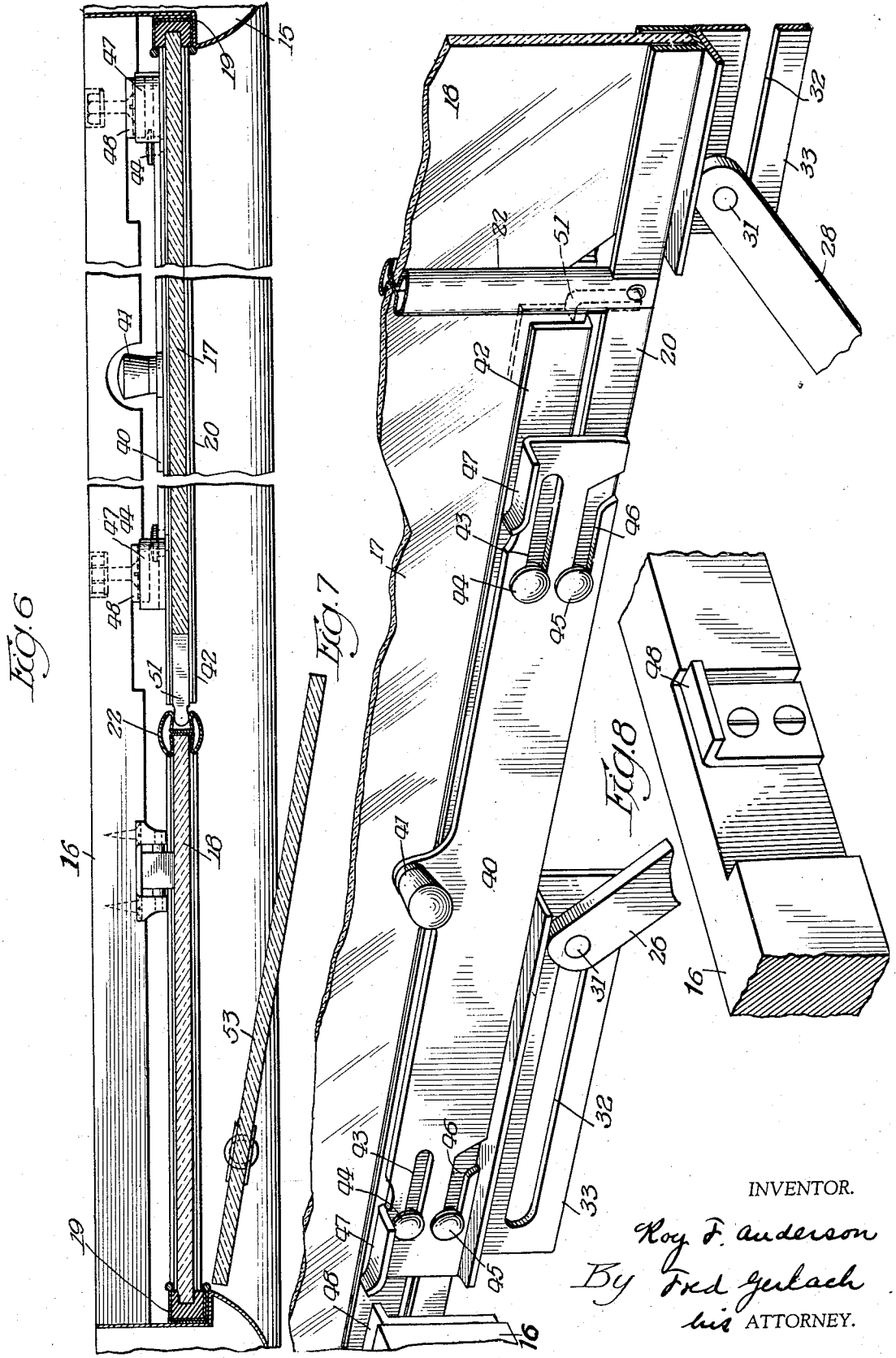

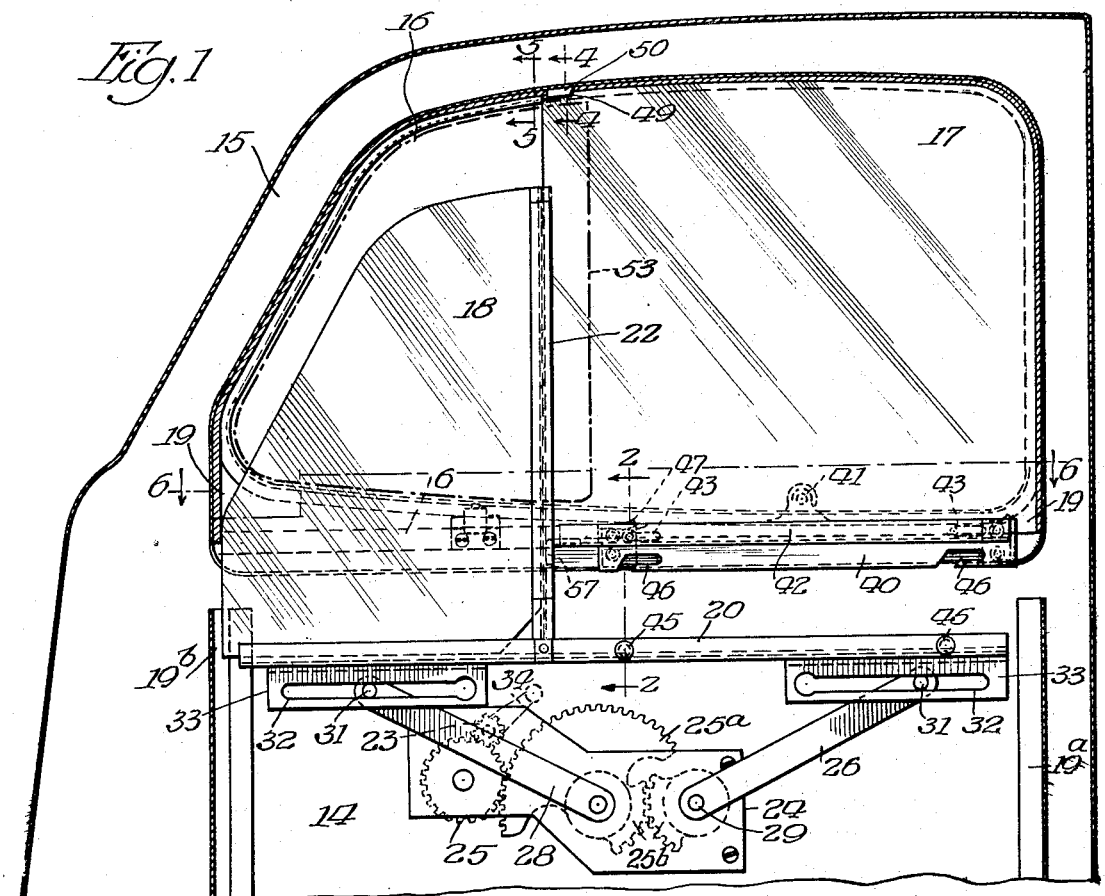
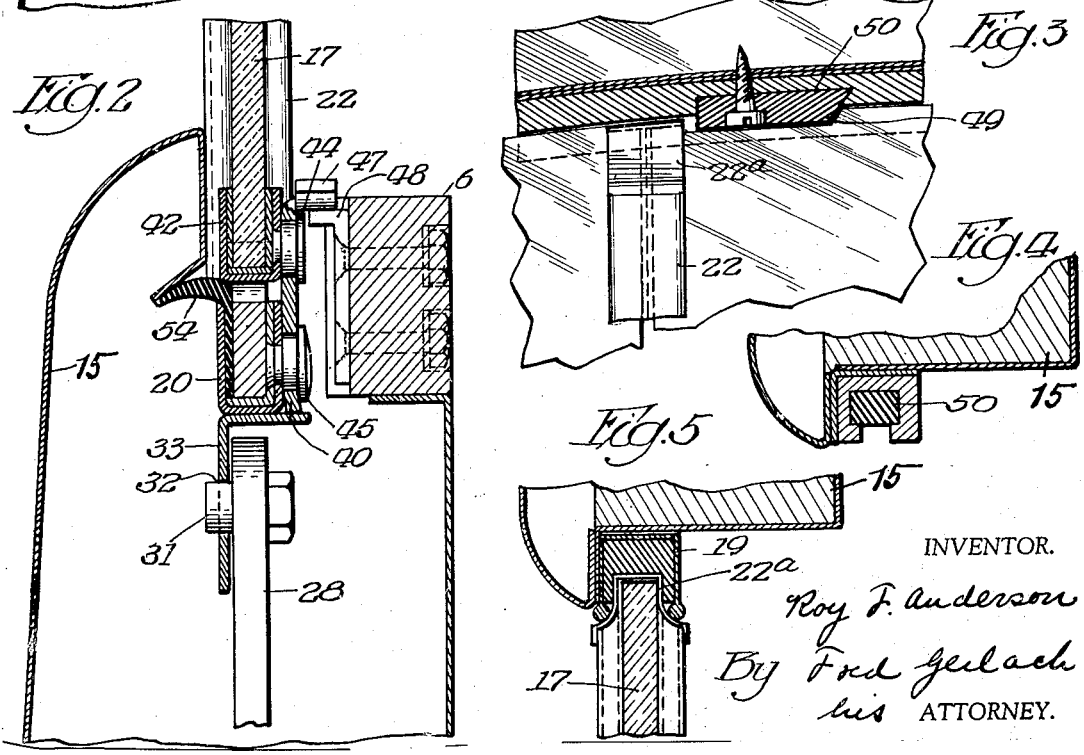

Patented Feb. 11, 1936

2,030,089

UNITED STATES PATENT OFFICE 2,030,089

WINDOW FOR VEHICLES

Roy F. Anderson, Auburn, Ind., assignor, by mesne assignments, to Indianapolis Corporation, Indianapolis, Ind., a corporation of Delaware Application December 18, 1933, Serial No. 702,895

5 Claims. (Cl. 296—44)

The invention relates to windows for use in the doors or bodies of vehicles.

The primary object of the invention is to provide a window structure in the door or body of a vehicle which comprises a pair of coplanar transparent panels which are fitted in a single window opening and are slidably mounted so that they may be conjointly lowered into a well below the window-opening, with means for independently locking the rear panel in position to close a portion of the window-opening to control the ingress and egress of air through the portion of the opening normally closed by the front panel.

Another object of the invention is to provide a window structure of this type which is adapted to be used with or without a wing whereby currents of air may be deflected away from the front portion of the opening or into the body through the front portion of the opening.

A further object of the invention is to provide a window or window structure for the doors or bodies of vehicles which is generally of new and improved construction and is efficient in operation.

Other objects of the invention will be apparent from a consideration of the following detailed description.

The invention consists in the several novel features which are hereinafter set forth and are more particularly defined by claims at the conclusion hereof.

In the drawings which accompany and form a part of the present specification or disclosure and in which like numerals of reference denote corresponding parts throughout the several views: Fig. 1 is a longitudinal section through the door of an automobile body embodying the invention, the front slidable panel being illustrated as partly lowered while the rear panel is locked in its raised or closed position. Fig. 2 is an enlarged section on line 2—2 of Fig. 1. Fig. 3 is a vertical section of the door adjacent the top of the contiguous edges of the front and rear window panels. Fig. 4 is a section on line 4—4 of Fig. 1. Fig. 5 is a section on line 5—5 of Fig. 1. Fig. 6 is a horizontal section on line 6—6 of Fig. 1. Fig. 7 is a perspective of the mechanism for locking the rear window panel in its raised position, the slidable locking bar being shown released to permit the panel to be lowered. Fig. 8 is a perspective of one of the locking lugs secured to the body which co-act with the locking bar to secure the rear panel in its raised position.

The invention is exemplified as applied to the door 15 of an automobile which is provided with a single window-opening 16 of suitable shape and a well 14 below said opening. The window comprises a glass plate or panel 17 which is adapted to close the rear portion of the window-opening and is mounted to slide vertically into the well 14, and a glass panel 18 which is coplanar with the panel 17, is slidably mounted in the door and movable into the well and is adapted to close the front portion of the window-opening 16. The rear margin of the panel 17 is slidably guided in a channel bar 19 at the back of the window-opening and is also guided, when lowered, in a channel bar 19ª in the well. The front margin of the panel 18 is slidably guided in the channel bar 19 which extends over the top of the window-opening to receive the top margins of both panels. The front panel 18 is also guided, when lowered, in a channel 19ᵇ. A channel bar 22 is fixedly secured to the rear margin of the front panel 18 and is provided with a groove to receive the front margin of the rear panel 17, which will form an interfitting slidable connection between the panels. The lower margin of the front panel 18 and the lower end of channel bar 22 are fixedly secured in a horizontally extending channel bar 20, which extends rearwardly from bar 22 to constitute a support for both panels. This bar 20, with the panel 18 and the panel 17, when it is locked to the bar, serves to raise or lower both panels conjointly. Any suitable operating mechanism is provided for raising and lowering the bar 20 which is operable by the occupant of the vehicle from the inside, such as, a handle or crank 34; a pinion 23 fixed to be rotated by the crank; a gear 25 meshing with said pinion; a curved rack 25ª meshing with gear 25; an arm 28 fixed to the shaft of rack 25ª and carrying at its distal end a stud 31 which extends into a groove 32 in an angle bar 33 to which is fixed the channel bar 20; a second arm 26 which is fixed to a shaft 29; and a pair of meshing racks 25ᵇ on the rack 25ª and the shaft 29, respectively, to shift synchronously the arms 26, 28 for rectilinear movement of the channel bar 20. This operating mechanism is mounted in a supporting plate 24 which is fixed to the door in the well 14. Arm 26 is also connected to the channel bar 20 by means of a stud 31 and a longitudinal slot 32.

This exemplifies lifting mechanism for raising and lowering the channel bar 20 to which is fixed the front panel 18 and which is also adapted optionally to carry the rear panel 17.

At times it is desirable to open only the front portion of the window-opening for the ingress or egress of air while the rear panel 17 remains closed. For this purpose the front panel 18 is fixedly secured to the channel bar 20 and is adapted to be raised or lowered by the lifting mechanism independently of the panel 17. At times it is also desired to lower conjointly both panels to open the entire upper portion of the window-opening for the ingress or egress of air and for this purpose a releasable locking device is provided between channel 20 and the rear panel 17, whereby said panel will be caused to be raised and lowered with the bar 20 and the front panel 18. This locking device is releasable to permit the rear panel to be uncoupled so that the front panel and bar 20 may be lowered independently of the rear panel. For the purpose of securing the rear panel in its raised position when it is desired independently to shift the front panel, this locking device is equipped to lock the rear panel 17 in its raised position. This locking device comprises a horizontally extending bar 40, which is provided with a handle 41 whereby it may be shifted longitudinally. This bar 40 is slidably connected to a channel bar 42, which is fixed to the lower margin of the rear panel 17, by means of elongated slots 43 in said bar and studs 44 riveted to the channel bar 42. The bar 40 is adapted to be coupled to the supporting channel bar 20 to which are affixed a pair of studs 45, by means of elongated slots 46 which are formed in the bar 40 and which open at their front ends to permit the studs 45 to pass to and from said slots 46. When the locking bar 40 is shifted into the position shown in Fig. 1, the studs 45 will register with the open ends of slots 46, so that the channel bar 20, with the studs 45, may be uncoupled from the locking bar 40 and the rear panel 17, and so that when the lifting mechanism is operated the front panel 18 will be raised and lowered independently of the rear panel.

When it is desired to lower the rear panel the locking bar 40 is shifted forwardly while the studs 45 are in the slots 46, so the studs will pass into the position shown in Fig. 7. Thereupon the rear panel 17 will be coupled to the bar 20 and the shifting mechanism, when manipulated, will conjointly raise or lower both the front and rear panels. When the front panel 18 is to be lowered independently of the rear panel 17, it is necessary to lock the rear panel in its raised position. For this purpose the locking bar 40 is provided with a pair of inwardly extending lugs 47 which are adapted to slide over a pair of lugs 48 which are fixed to the body of the door, when the locking bar is shifted into position to uncouple the bar 20 from the rear panel, or the position illustrated in Fig. 1. This construction exemplifies a device which is optionally operable to lock simultaneously the panel 17 in its raised position when that bar is shifted into position to permit independent movement of the lifting bar 20 and to release simultaneously the rear panel and couple it to the lifting bar 20 when the latter is in its raised position.

The rear ends of the lugs 47 are curved upwardly so that the panel 17 can be tightly jammed into its raised position. The upper front corner of the rear panel 17 is notched, as at 49, to receive a rubber block 50 which is secured in the channel to prevent any looseness of the panel 17 at the top thereof when it is held in its raised position independently of the lifting bar 20. A lug 51 is fixed on the channel bar 42 in which the lower margin of the rear panel is fixed and extends into the vertical channel bar 22 to guide the vertically sliding bar 22 with respect to the channel bar 42 when the latter is locked in the window-opening with the rear panel 17. A flexible weather strip 54 (Fig. 2) may be carried by the lifting bar 20 to close the gap between the top of the well in the door and the overlying door structure. The upper end of the vertical channel bar 22 is preferably contracted as at 22ª (Fig. 5) so that it will be confined in the central portion of the channel bar 19 when the front panel 18 is raised.

The invention is adapted to be used with or without a laterally swinging wing, indicated at 53 in Fig. 6 and by dotted lines in Fig. 1. This wing is usually pivoted intermediate its front and rear edges so that when the front panel 18 is lowered the wing may be swung to an angle which will deflect air into the body through the front portion of the window-opening so the wing may be used to control the aspiration of air from the body to the outside when it is swung into position indicated in Fig. 6. In some instances, however, the independently movable front panel 18 is sufficient to control the front portion of the opening for the ventilation desired.

The invention is not to be understood as restricted to the details set forth, since these may be modified within the scope of the appended claims without departing from the spirit and scope of the invention.

Having thus described the invention, what I claim as new and desire to secure by Letters Patent is:

1. The combination with a vehicle comprising a structure having a window-opening therein and a window-well below the opening, of a composite window for closing the window-opening comprising front and rear substantially coplanar panels mounted to slide vertically in the door from window-closing position into the well and vice versa, raising and lowering mechanism to which the front panel is fixedly connected, means for optionally connecting the rear panel to said mechanism so that it is conjointly shiftable with the front panel, and means for locking the rear panel to the structure after disconnection thereof from the raising and lowering mechanism in order that said front panel may be shifted by the mechanism independently of the rear panel.

2. The combination with a vehicle comprising a structure having a window-opening therein and a window-well below the opening, of a composite window for closing the window-opening comprising front and rear substantially coplanar panels mounted to slide vertically in the door from window-closing position into the well and vice versa, means for raising and lowering the two panels comprising a vertically movable horizontal bar having one end thereof connected fixedly to the bottom portion of the front panel and its other end extending under the bottom portion of the rear panel, means for optionally connecting the rear panel to the lifting bar so that it is conjointly shiftable with the front panel, and means for locking the rear panel to the structure after disconnection thereof from the bar in order that said front panel may be shifted by the mechanism independently of the rear panel.

3. The combination with a vehicle body comprising a structure having a single window-opening therein and a window-well below the opening, of a composite window for closing the window-opening comprising two substantially coplanar panels disposed one in front of the other and mounted to slide vertically from window-closing position into the well and vice versa, raising and lowering means to which one of the panels is fixedly connected, a horizontally shiftable bar associated with said other panel and adapted when shifted in one direction to lock the other panel to the raising and lowering means so that it is conjointly shiftable with said one panel, and means associated with said bar and adapted upon release of said other panel from the raising and lowering means and in response to shift of the bar in the opposite direction to lock said other panel in its raised or window-closing position in order to provide for the independent raising and lowering of said one panel by the aforesaid means.

4. The combination with a vehicle body comprising a structure having a window opening therein and a window well below the opening, of a composite window for closing the window opening comprising two substantially coplanar panels positioned one in front of the other and mounted to slide vertically into a window-closing position in the well and vice versa, means for raising and lowering the two panels, comprising a vertically movable, horizontally extending bar having one end thereof connected fixedly to the bottom portion of one of the panels and its other end extending under the bottom portion of the other panel, a horizontally slidable locking bar mounted on the bottom portion of said other panel, a releasable stud and slot connection between the two bars adapted when the locking bar is shifted in one direction to connect said other panel to the horizontally extending bar so that it is conjointly shiftable with said one panel and adapted when shifted in the opposite direction to release said other panel so as to permit of independent shift of the one panel by the raising and lowering means, and means adapted when the locking bar is shifted in said opposite direction to release the other panel with respect to the raising and lowering means to lock said other panel in its raised or window-closing position and thus permit of independent shift of the one panel by said raising and lowering means.

5. The combination with a vehicle body comprising a structure having a window opening therein and a window well below the opening, of a composite window for closing the window opening comprising two substantially coplanar panels positioned one in front of the other and mounted to slide vertically into a window-closing position in the well and vice versa, means for raising and lowering the two panels, comprising a vertically movable, horizontally extending bar having one end thereof connected fixedly to the bottom portion of one of the panels and its other end extending under the bottom portion of the other panel, a horizontally slidable locking bar mounted on the bottom portion of said other panel, a releasable stud and slot connection between the two bars adapted when the locking bar is shifted in one direction to connect said other panel to the horizontally extending bar so that it is conjointly shiftable with said one panel and adapted when shifted in the opposite direction to release said other panel so as to permit of independent shift of the one panel by the raising and lowering means, and a device coacting with the locking bar and operative upon shift of the last mentioned bar in said opposite direction to lock the other panel in its raised position and thus permit of independent shift of the one panel by the raising and lowering means.

ROY F. ANDERSON.